Patented Aug. 7, 1945

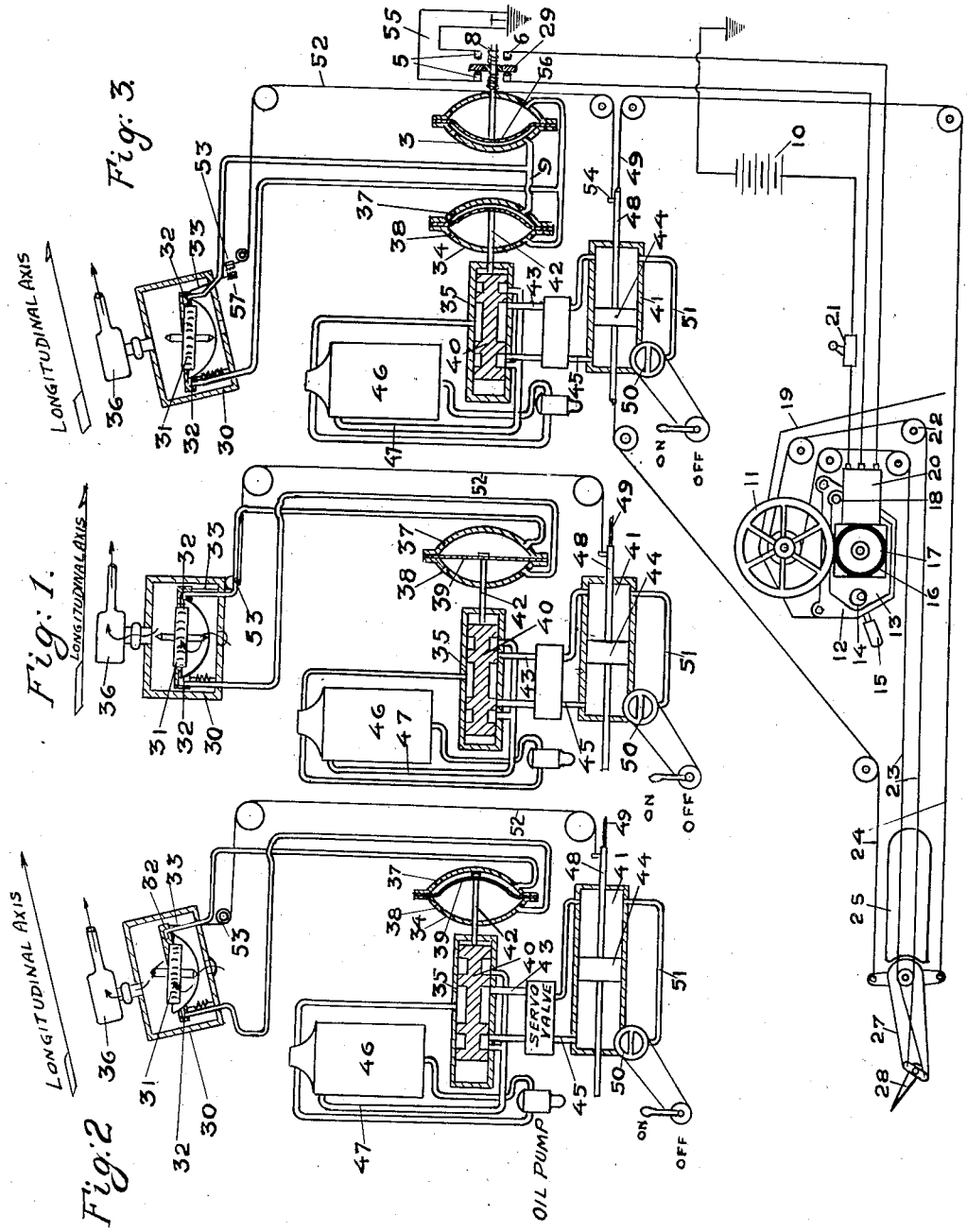

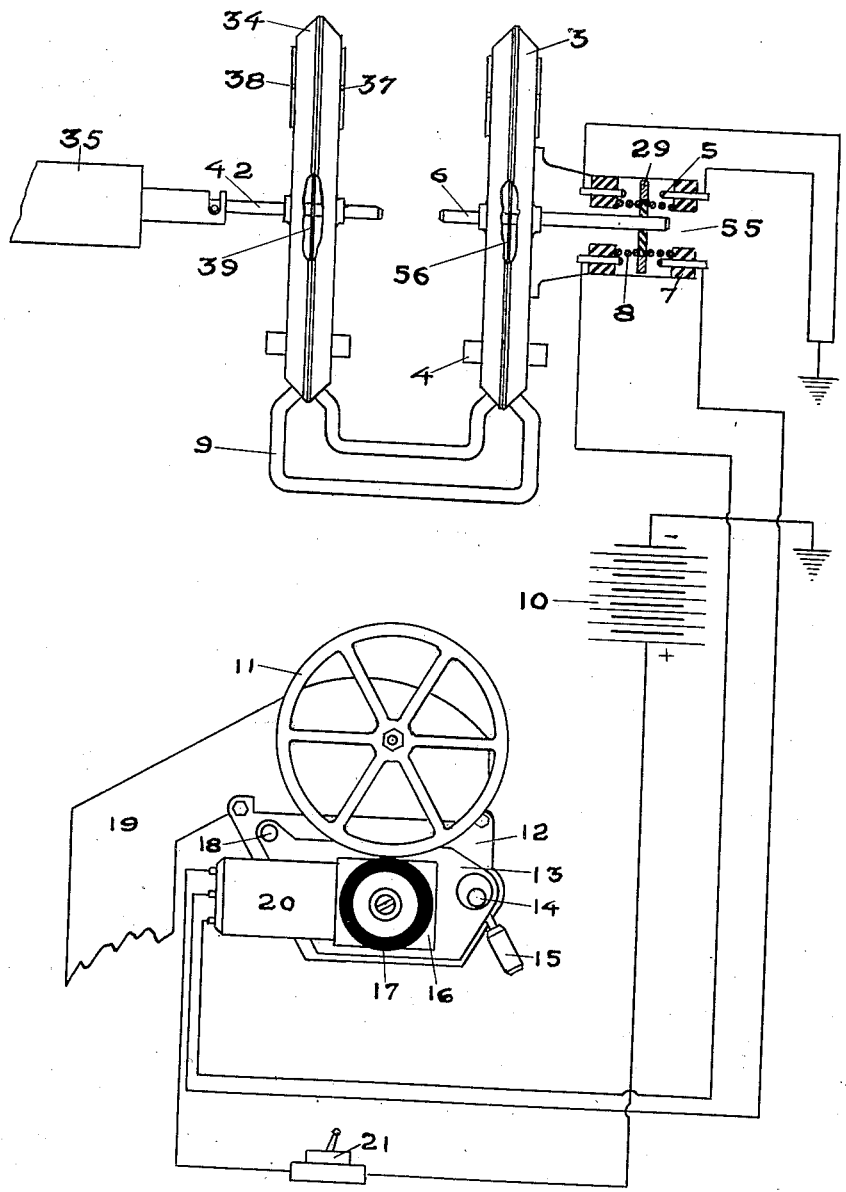

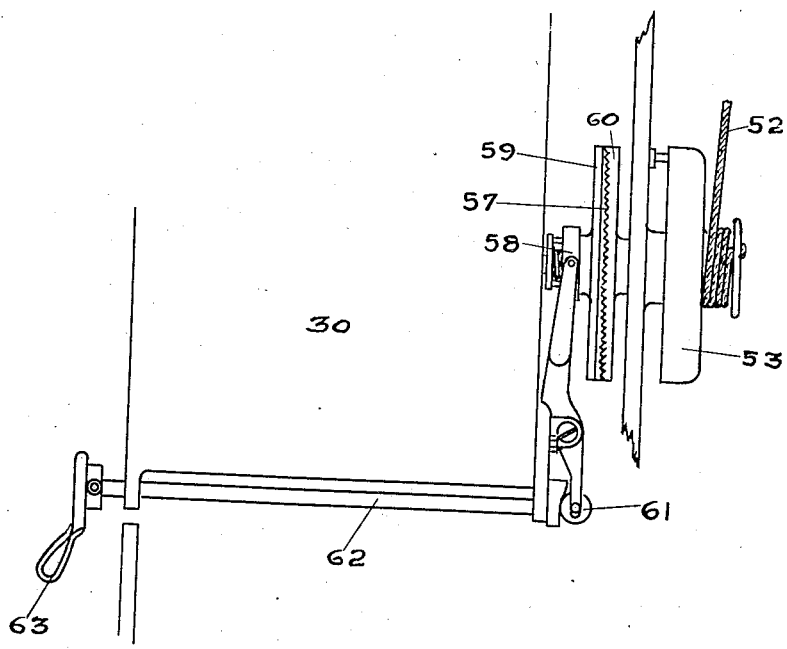

2,381,840

UNITED STATES PATENT OFFICE 2,381,840

AUTOMATIC LONGITUDINAL TRIMMER

Rudolph K. Schaefer, Bernard Allen, and Rufino López, Brownsville, Tex.

Application August 25, 1943, Serial No. 500,020

6 Claims. (Cl. 244—76)

This invention refers to a device intended to maintain the proper trim of an airplane for any desired longitudinal attitude by means of the automatic operation of the elevator trim-tab control surface. This device will henceforth be alluded to in this specification as the automatic longitudinal trimmer.

The proposed automatic longitudinal trimmer is a device which, functioning as an adjunct of the Sperry bank-and-climb control unit of the Sperry Gyropilot of the pneumatic-hydraulic type, maintains an airplane in the proper fore-and-aft trim for any desired longitudinal attitude of the airplane by automatically adjusting the setting of the elevator, trim tab in such direction as to compensate for any load shifts in the airplane's cabin, regardless of whether the airplane is being flown automatically or manually. An example of such load shifts is the movement of the steward or of the passengers up and down the aisle of an airplane's cabin. Load shifts of this nature are very often of such frequency as to impose undue hardship and tedious labor on the human pilot, who must inevitably re-trim the airplane manually by turning the trib-tab control wheel, even when the plane is on automatic pilot, or else the airplane will gradually gain or lose altitude until the plane's attitude is corrected. The larger the air transport is, the bigger the problem of maintaining the proper trim of the aircraft becomes.

By "trimming" of an airplane is meant the establishment of absolute equilibrium of the forces on that airplane by adjusting the setting of its control surfaces in accordance with its loading conditions in such fashion that the airplane will maintain any desired longitudinal attitude of flight "hands off," that is, without the need of constant application of force by the human pilot on the controls. Hence, an airplane may be trimmed for straight horizontal or level flight or for any desired climbing or gliding angle.

Present-day practice makes it mandatory for the human pilot to do all trimming of the airplane manually by adjusting the elevator-tab trimming wheel every time that a load shift causes a change in the attitude of the ship. This requirement or need of manual trimming of the airplane exists regardless of whether the airplane is being flown automatically or manually. Normally, the relatively slight shifts of the load in the airplane produce such small changes in the attitude of the plane as to be nearly imperceptible by the human pilot, becoming noticeable only by the instrumental indications of a gain or loss of altitude and a change in the airspeed reading. As far as the Gyropilot is concerned, when it is engaged, the extremely small changes in the attitude of the airplane do not cause sufficient displacement of the air pick-offs to produce strong enough control impulses to enable the air relay valve to operate a balanced oil valve, which sets up the hydraulic impulse in the servo unit required to actuate the airplane's controls. Hence, the Gyropilot does not react at all and fails to respond with any corrective action. However, even if it were able to effect corrective control, the necessity for re-trimming the airplane through a new setting of the elevator tab necessary to meet the change in the load conditions would still exist; otherwise, "hunting" of the plane would result, since the Gyropilot would constantly fight the out-of-trim condition and produst "seesawing" (hunting) of the airplane. Once again it is seen how the human pilot would be compelled to perform the trimming process manually.

The automatic longitudinal trimmer maintains the proper trim for any desired fore-and-aft attitude of the airplane, regardless of whether the plane is being flown automatically or manually, without requiring any attention by the human pilot, who will be relieved of one of the most exasperatingly dull tasks of modern flying of air transports and who will be able to devote more time to other more important duties. In addition, the airplane will fly a truer course, closer to the theoretical, with less "loping" up and down and with the consequent improvement in all-around performance and efficiency.

Figure 1 represents a schematic sketch of the conventional pneumatic-hydraulic type of Sperry automatic pilot system in a condition of "balance" or "equilibrium" for horizontal longitudinal attitude. Figure 2 represents the same system as that of Figure 1 except for an "unbalanced" condition caused by a nose-up attitude of the plane.

Figure 3 represents the auto-pilot system in the same "unbalanced" condition shown in Figure 2 and with the automatic longitudinal trimmer connected up to the system as an adjunct.

Figure 4 is an amplified schematic sketch of the vital elements of the automatic longitudinal trimmer. The proper relationships of the component parts of the device are shown.

Figure 5 is a schematic sketch of the clutch assembly for engaging and disengaging the elevator follow-up control from the bank-and-climb control unit when the airplane is being flown manually and automatic trimming is desired.

In order to comprehend better how the automatic longitudinal trimmer goes about solving the problems of automatic trimming, it will be necessary to demonstrate what occurs in the Sperry Gyropilot system when it is called upon to fly the airplane. This description of the operating principles will be confined exclusively to the longitudinal function in order to show the proper relationship between the Gyropilot and the automatic longitudinal trimmer. It will be necessary to illustrate through schematic diagrams and relevant explanations the action of the bank-and-climb control unit of the Gyropilot during (1) a neutral or balanced condition and (2) a deviation from neutral or unbalanced condition. Throughout the entire discussion of the operation of the Gyropilot it is assumed that the airplane is properly trimmed prior to engaging the auto pilot and remains in proper trim.

Case I. Neutral condition of the Gyropilot (Figure 1)

In the schematic diagram shown in Figure 1 is represented the Gyropilot system during a balanced or neutral condition for straight, horizontal flight. 30 represents the box which comprises the bank-and-climb control unit. Only the most essential parts of this unit are shown: the gyro 31, the air pick-offs 32, and the follow-up mechanism 33. As in other gyroscopic instruments used to establish an artificial horizon, the heart of the bank-and-climb control unit is the gyro 31, which, by virtue of its characteristic property of remaining fixed or rigid in space, maintains its axis vertical, the airplane revolving around it, with the changes in the flight attitude of the airplane visually indicated to the human pilot on the dials of the Gyropilot bank-and-climb control unit. The air pick-offs 32, which are merely specially designed orifices, form an integral part of the airplane as more fully described hereinafter, and hence more in unison with it. The angular displacement of the pick-offs 32, which are located on a line parallel to the fore-and-aft line of the airplane, with respect to the gyro 31, which maintains its axis always vertical regardless of the attitude of the plane, governs the actuation of the airplane controls for automatic flying. The air pick-offs 32 are connected as shown to the air relay valve 34, which is mechanically coupled to the balanced oil valve 35. Air is sucked or pulled into the bottom of the bank-and-climb unit box 30 by the suction pump 36 and is directed to the gyro 31 to spin it. Air is also drawn in from the air relay valve 34 through ports 37 and 38 by the suction pump 36. The air exhausts at the top of the box and flows towards the suction pump 36.

In the case illustrated by Figure 1, the Gyropilot system is neutral or balanced, that is, air is being drawn in through ports 37 and 38 of the air relay valve 34 in exactly equal amounts because of the zero angular displacement of the air pick-offs 32 with respect to the gyro 31, maintaining equal suction on both sides of the diaphragm 39. Therefore, there is no deflection of the diaphragm 39, and the oil valve piston 40 of the balanced oil valve 35 is not displaced linearly and remains in the neutral position, no oil flowing to the servo cylinder 41. With no servo action, the controls are not actuated. The servo-motor may be of a conventional type employed in modern aircraft control systems. One common form, employing over-power valves, is shown in the U. S. Patent to Heintz, No. 2,336,096 (see Fig. 7).

Case II. Out-of-neutral or unbalanced condition of the Gyropilot

In the schematic diagram of Figure 2 is represented the Gyropilot system during an out-of-neutral or unbalanced condition, the airplane pitching upward because of an external disturbance (such as a wind gust) acting on the front part of the plane. In this position, the air pick-offs 32, moving integrally and in unison with the plane, are no longer neutral with respect to the gyro element 31, one port of the air pick-off being fully opened and the other fully closed. This produces what is known as a control impulse, that is, a pressure differential between the air pick-offs 32, which are connected to the air relay valve 34. This causes one side of the diaphragm 39 of the air relay valve 34 to receive increased suction, while the suction on the other side falls off, since it is shut off at the air pick-off 32 and outside air can still flow in at port 38. Since the air relay valve 34 is mechanically coupled to the balanced oil valve 35 by means of shaft 42 the deflection of the diaphragm 39 moves the balanced oil valve piston 40 to the right, permitting oil to flow to the servo unit 41 through pipe 43. Oil enters one end of the cylinder and moves the piston 44, an equal amount of oil being exhausted through pipe 45 and flowing back to the sump 46 through pipe 47. Piston rod 48 of the servo piston 44 is connected to the elevator control cables of the airplane 49.

Valve 50 is the "on-off" control valve for the hydraulic system of the Gyropilot. When the human pilot is flying the airplane manually, the valve is placed 90 degrees from position shown, permitting the oil to flow through the by-pass tube 51 and allowing the controls to be moved freely.

In controlling an airplane, it is not only necessary to apply control to bring the plane back to neutral when it has been disturbed but also to begin to remove the applied control as the airplane is returning to neutral, so that the control surface will be back in neutral when the disturbance has been fully corrected. A further requirement is that the amount of control be applied in proportion to the displacement of the airplane. All this is necessary to both manual and automatic control, and in the latter case is handled by the follow-up system. The air pick-offs 32 are not fixed rigidly to the gyro box 30 and the airplane, but instead, can be moved in relation to them by the follow-up mechanism 33. A cable 52 is connected to the servo piston rod 48 and runs to the follow-up pulley 53 on the gyro box 30. The pulley 53 controls a gear which is connected to another gear on the air pick-offs 32. When servo piston 44 moves to the left, the follow-up cable at 54 moves likewise, and through the action of pulley 53 and the connected gearing moves one port of the air pick-off down and the other up. When they reach a neutral position (both half open), the air relay valve 34 and the balanced oil valve 35 are centered, and the servo piston movement away from neutral is stopped. The control surface movement which the servo has been producing has been bringing the airplane back to level flight. As the airplane continues on toward level, the air pick-offs 32, which have been driven ahead of the gyro box 30, pass beyond the neutral point and begin to cause servo movement in the opposite direction. This is not opposite control but is the removal of the control originally applied. The mechanism and its ratios are so arranged that the correct amount of control will be applied and also removed at the proper rate as the plane returns to level.

The above illustrates the method of automatic application of control by the Gyropilot system in responding to an external disturbance which has caused an out-of-neutral condition of the system by the change in attitude of the plane's flight. These external disturbances are always of such nature as to cause a strong impulse to be produced, with the consequent application of corrective control. It must be noted that all automatic control is applied through the main control surfaces directly. There is no connection of the elevator trim tab to any part of the Gyropilot system, and, therefore, the trim tab will not operate unless the human pilot manually causes it to do so.

In the event of disturbances of the desired longitudinal attitude of the airplane caused by "out-of-trim" conditions produced by the load shifts in the airplane cabin, the Gyropilot does not respond with any corrective action, the plane gradually gaining or losing altitude until the human pilot restores the plane to its proper-trim condition by operating the elevator-tab control wheel in the required direction. Even if an out-of-trim condition would change the attitude of the plane sufficiently to produce a full impulse, the Gyropilot, in this instance, would "hunt" because it would constantly fight the out-of-trim condition and produce oscillation of the control. Hence, for all such disturbances of the fore-and-aft trim of the airplane arising out of changes in flight attitude, power, altitude, and load shifts, the Gyropilot is of no value, since it fails to react at all or else its control is inadequate and undesirable. The human pilot, therefore, must trim the airplane manually. The proper trimming procedure is to disengage the Gyropilot for a few seconds and to note whether the airplane tends to nose up or down. A trim correction is then made with the elevator trim tab. In large air transports with long cabins and carrying a large number of passengers, the problem of manual trimming presents one of the dullest and most enervating tasks of an airline pilot, since the steward or the passengers are constantly shifting in the cabin, and such movements upset the fore-and-aft trim of the airplane.

*Automatic trimming: [I] Description of the automatic longitudinal trimmer*

The automatic longitudinal trimmer is a device which will maintain the airplane in proper trim, regardless of whether it is being flow automatically or manually, by the automatic operation of the elevator trim tab. The basic principle on which said device was developed is that, even for such almost imperceptible changes in the attitude of the plane occasioned by the small shifts of cabin loads, there is a control impulse, however weak, produced in the Gyropilot bank-and-climb control unit. This impulse, which is simply a pressure differential between the air pick-offs 32 (Figure 3), as normally too weak to cause the air relay valve 34 to push or pull the balanced oil valve 35 and thereby actuate the servo unit to produce movement of the control surface. However, such weak impulses, are utilized in the automatic longitudinal trimmer to operate a pressure-sensitive, no-load switch 55, which in turn allows the proper field winding of a small electric motor 20 to become energized and produce rotation in such direction as to drive the elevator-tab control wheel 11 through a roller 17 fixed to the motor shaft in the direction necessary to effect a new setting of the tab 26 corresponding to the changed load distribution.

Figure 4 is a schematic drawing of the automatic longitudinal trimmer. An air relay valve 3 is connected in parallel with the usual air relay valve 34 of the Gyropilot system through rubber tubing 9. The shaft of the air relay valve 3 carries a silver contact ring 29, which is insulated from the shaft 6 mounted on a bracket attached to the body of the air relay valve 3 are four silver contact points 5, which are connected with leads according to the wiring diagram shown. The contact ring 29 and the contact points 5 constitute a sensitive two-way switch 55, which is controlled exclusively by the deflection of the diaphragm 56 of the air relay valve 3. The switch merely bridges a gap in the "ground" lead of each of the two field windings of the electric motor 20, which operates the control wheel 11. By bridging across one pair of contacts 5 the instant-reversal, split-field, electric motor 202 is put into operation by the energizing of the proper field winding in the motor. The contact ring 29 is centralized between the contact points 5 by means of two very light centralizing springs 8 which prevent any movement of the shaft of the air relay valve 3 caused by acceleration forces, etc. When one field winding of the motor is energized, the motor revolves in the clockwise direction; energizing the other field winding causes the motor to turn in the counterclockwise direction. Motor 20 drives a live-rubber roller 17, which in turn friction-drives the trimming wheel 11 at a speed ratio of 2 to 1 (trim wheel speed ½ of roller speed). The roller 17 is not driven directly off the motor shaft but through a gear reduction box 16. The operating motor 20 and the roller drive 17 are both mounted on a movable bracket 13, which is pivoted on 18. The latter is anchored on to a fixed bracket 12 bolted to the control pedestal 19). To engage and disengage the roller drive 17 from the trimming wheel 11, a lever 15 is moved up or down. The engaging mechanism consists of a self-locking eccentric 14, which does not permit the lever 15 from springing or slipping off of its set position. Switch 21 controls the current supply to the motor 20 from the plane's battery 10 and operates automatically with the lever 15, turning "off" when the trimmer is disengaged and "on" when the trimmer is engaged.

*Automatic trimming: [II] Operating principles of the automatic longitudinal trimmer*

The pressure-sensitive actuating switch 55 is so designed and constructed that there are no frictional or spring loads whatsoever to overcome. Hence, the weakest impulse produced in the bank-and-climb control box 30 whenever there is a slight change in the longitudinal attitude of the plane, will suffice to deflect the diaphragm 56 of the air relay valve 3 and thereby to close the circuit on the required field winding of the instant-reversal, low-inertia, split-field electric motor 20, which will turn and drive the trim-tab control wheel 11 in the desired direction for proper trim setting. Whenever there is a load shift in the cabin that will change the fore-and-aft trim of the plane, the almost imperceptible change in the longitudinal attitude of the plane will cause a differential pressure impulse to be produced at the air pick-off 32 and to be transmitted to the air-relay-operated switch 55, which then translates it into an electrical impulse in the field-winding circuit of the electric motor 20. The latter will then friction-drive the trimming wheel 11, which is connected to the elevator trim tab 26, until the main control surface 27 assumes the setting required to restore the plane to its proper fore-and-aft trim. As the plane gradually returns to this condition, the "signal" is also gradually tapering down to zero, and when it does disappear, the sensitive switch 55 is centralized and opens the circuit. The motor 20, being of low-speed and low-inertia characteristics, stops instantly and prevents overcontrol.

Attention must be called to the effects of the follow-up system of the Gyropilot on the trimming action of the automatic longitudinal trimmer. When the plane is being flown automatically (Gyropilot "on") and the trim-tab setting is being changed, the main control surface (elevators) 27 moves up or down accordingly. Since the follow-up system of the Gyropilot is connected to the main control surface by means of cable 52, any movement of the elevators 27 is accompanied by a simultaneous follow-up movement of the air pick-off 32 in the box 30.

When the plane is being flown manually (Gyropilot "off") and the trim-tab setting is being changed to effect a correction to obtain the proper fore-and-aft trim, the follow-up mechanism behaves in a similar manner as described above in the case of automatic flight. In this case, if left uncorrected, the effect of the follow-up would finally result in overcontrol by the trimmer. Overcontrolling would produce a constant and gradual oscillation up and down of the plane in flight. Therefore, in order to counteract the ill effects mentioned, the most practical thing to do is to eliminate any detrimental action of the follow-up by disengaging it from the bank-and-climb control box 30 at the follow-up spring clutch assembly 57 back of the box. Disengagement is readily and safely feasible by the device shown in Figure 5.

In Figure 5, 58 is a wish-bone-shaped yoke which is so pivoted that its prong ends, working in a circular annular groove on the clutch assembly 57, can force the spring-loaded clutch disc 59 of the bank-and-climb control box 30 away from the pyramid-aluminum drive disc 60 connected to the follow-up pulley 53 around which the follow-up cable 52 is wrapped. The yoke 58 is operated by a cam-and-roller mechanism 61 through a shaft 62, which extends across the top of the box 30 and terminates with a handle 63. Stops insure that the operating range of the mechanism is not exceeded in either direction. For automatic flight, the follow-up clutch is engaged. For manual fight, it is disengaged.

Another point to bring out to light is that the rate of trim is approximately 3 degrees per minute, a speed which is so comparatively slow with respect to the speed of control at the Gyropilot that the coincidental operation of the trimmer during large displacements of the aircraft does not tend to interfere or fight against the Gyropilot's application of control. On the contrary, it helps to obtain a smoother and steadier corrective action from the Gyropilot. The use of the correct trimming speed is essential if oscillation of the controls is to be avoided.

*Procedure for operating the automatic longitudinal trimmer*

The following are the specified instructions for operating the automatic longitudinal trimmer:

*Case I.*—For operation during automatic flight (Gyropilot "on").

(1) Set the automatic trimmer selector (mechanism for engaging and disengaging follow-up clutch back of bank-and-climb box) to "Automatic flight."

(2) Trim the airplane manually.

(3) Align the elevator index pointers on the box.

(4) Set the servo speed valve (elevator) to 3 on the dial.

(5) Engage the Gyropilot.

(6) Adjust the elevator speed valve for best flying by turning it only sufficiently towards "slow" to stop any oscillation (hunting) of the controls.

(7) Move the lever on the automatic trimmer down to engage (up to disengage).

*Case II.*—For operation during manual flight (Gyropilot "off").

(1) Set automatic trimmer selector to "manual flight."

(2) Trim the airplane manually.

(3) Align the elevator index pointers on the box.

(4) Move the lever on the automatic trimmer down to engage (up to disengage).

Caution: The function of the automatic trimmer selector is merely to engage or disengage the indexes of the bank-and-climb box from the follow-up system of the controls. On "Automatic flight" (Gyropilot "on") the follow-up system is connected, and the index on the box will move whenever the elevator control surface does. However, the reaction of the Gyropilot hydraulic system corrects the follow-up movement resultant from a change in the setting of the control surface brought about by a trimming process.

On "Manual flight" (Gyropilot "off") the follow-up must be disconnected; otherwise the automatic trimmer will overcontrol. Therefore, the index on the box will not move when the elevator control surface does, so that the index moves integrally and in unison with the airplane only when there is a change in the attitude of the plane.

We claim:

1. An automatic trimming device for aircraft having an elevator surface and a trim tab on said surface movable relatively thereto comprising, in combination, a first servo-motor for adjusting the elevator surface relatively to said craft; a second servo-motor for adjusting the trim tab relatively to said elevator surface; a first relay for controlling said first servo-motor; a second relay for controlling said second servo-motor; an artificial horizon; first means responsive to movements of a predetermined magnitude of the craft with respect to said horizon for operating said first relay in response to such movements; second means responsive to movements of the craft with respect to said horizon smaller than the movements to which said first responsive means responds, said second responsive means operating said second relay; and follow-up means actuatable by said elevator surface for adjusting said artificial horizon relatively to said craft.

2. An automatic control device for aircraft having an elevator surface and a trim tab on said surface movable relatively thereto comprising, in combination, an artificial horizon; first control means responsive to deviations of a predetermined magnitude of the craft from a predetermined attitude with respect to said horizon for operating said elevator surface; second control means responsive to deviations of less than said predetermined magnitude of the craft from a predetermined attitude with respect to said horizon for operating said trim tab; and follow-up means operable by said elevator surface for adjusting said artificial horizon with respect to the craft, whereby movements of the trim tab by said second control means causing a movement of the elevator surface will react on said first control means through said follow-up means.

3. An automatic control device for aircraft having an elevator surface and a trim tab on said surface movable relatively thereto, comprising, in combination, an artificial horizon; a pressure fluid pick-off for producing pressure fluid differentials in dependence of movements of the craft with respect to said horizon; first control means, including a relay, responsive to differentials exceeding a predetermined magnitude for operating said elevator surface; second control means, also including a relay, responsive to differentials of less than said predetermined magnitude for operating said trim tab, which will automatically cause a movement of said elevator surface by air reaction on said trim tab; and follow-up means operable by said elevator surface for adjusting said pick-off relatively to said horizon.

4. An automatic control device for aircraft having an elevator surface and a trim tab on said surface movable relatively thereto, comprising, in combination, an artificial horizon; first control means responsive to changes in attitude of the craft with respect to said horizon for adjusting the position of said elevator surface with respect to said craft at a relatively high rate of adjustment; second control means responsive to changes in attitude of the craft with respect to said horizon for adjusting the position of said trim tab with respect to said elevator surface at a lower rate of adjustment, thereby causing an adjustment of said elevator surface relatively to said craft at a rate of adjustment substantially lower than the rate of adjustment effected by said first-control means; and follow-up means for adjusting said artificial horizon with respect to said craft.

5. An automatic control device for aircraft having an elevator surface, a trim tab on said surface, a handwheel for adjusting said trim tab, an artificial horizon, means automatically responsive to changes in attitude of the plane with respect to said horizon for adjusting said elevator surface, and a follow-up connection between said surface and said automatically responsive means, said control device comprising, in combination, a servo-motor; means for engaging and disengaging said servo-motor and said handwheel; a relay actuated in response to changes in attitude of the plane with respect to said horizon for operating said servo-motor; and means for connecting and disconnecting said follow-up connection.

6. An automatic trim tab control device for aircraft having an elevator surface movable with respect to said craft, a trim tab on said surface movable with respect to said surface, a handwheel for moving said trim tab with respect to said surface, an artificial horizon, a pneumatic pick-off associated with said horizon, means operated by pressure impulses at said pick-off for moving said elevator surface, and a follow-up connection between said elevator surface and said pick-off, the control device comprising, in combination, means responsive to pressure impulses at said pick-off; an electric switch operated by said pressure impulse responsive means; a reversible motor controlled by said switch; means for engaging and disengaging said motor with said handwheel; and means in said follow-up connection for rendering said follow-up connection inoperative, at will.

R. K. SCHAEFER.
BERNARD ALLEN.
RUFINO LÓPEZ.